Patented Jan. 20, 1925.

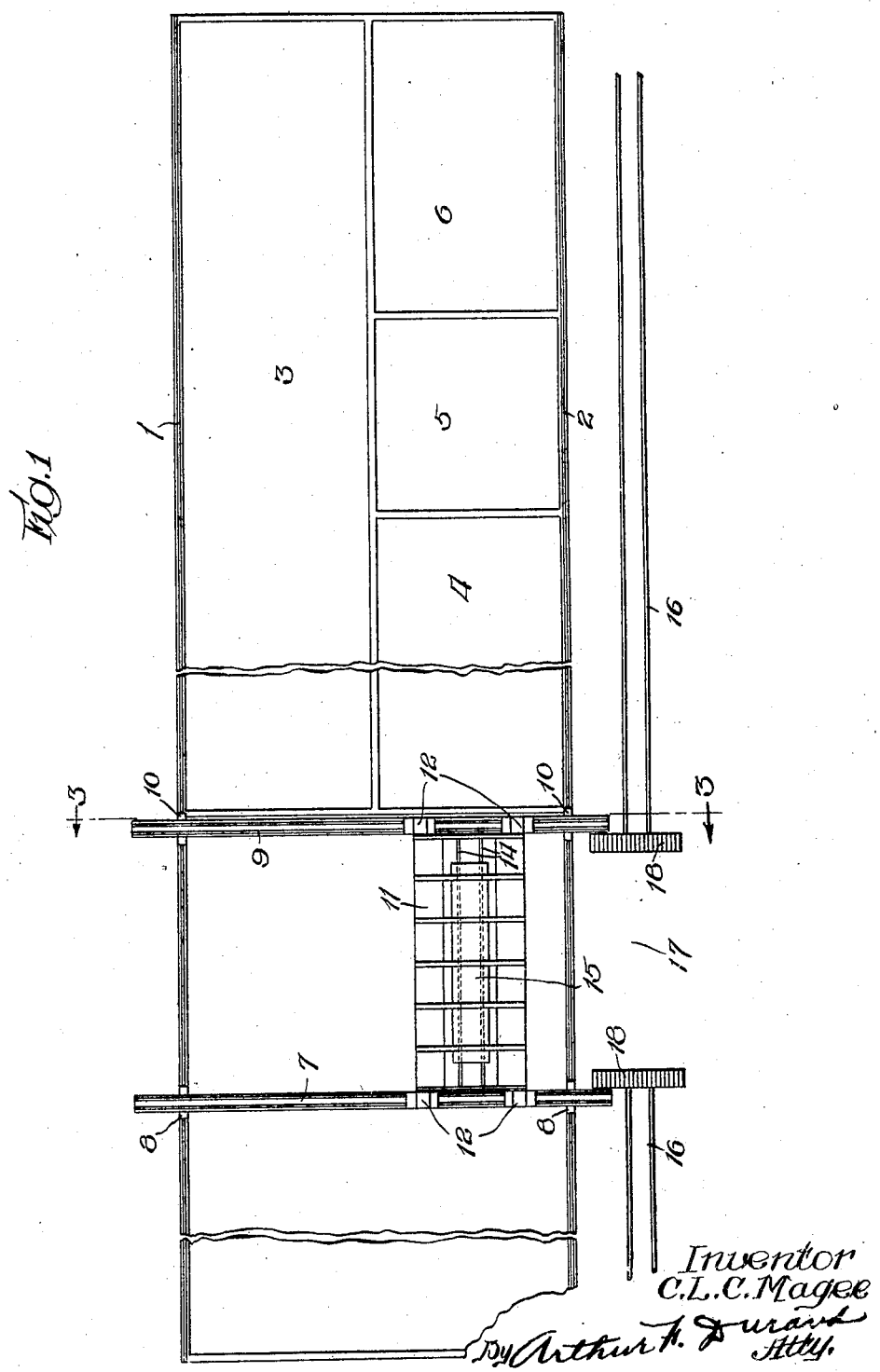

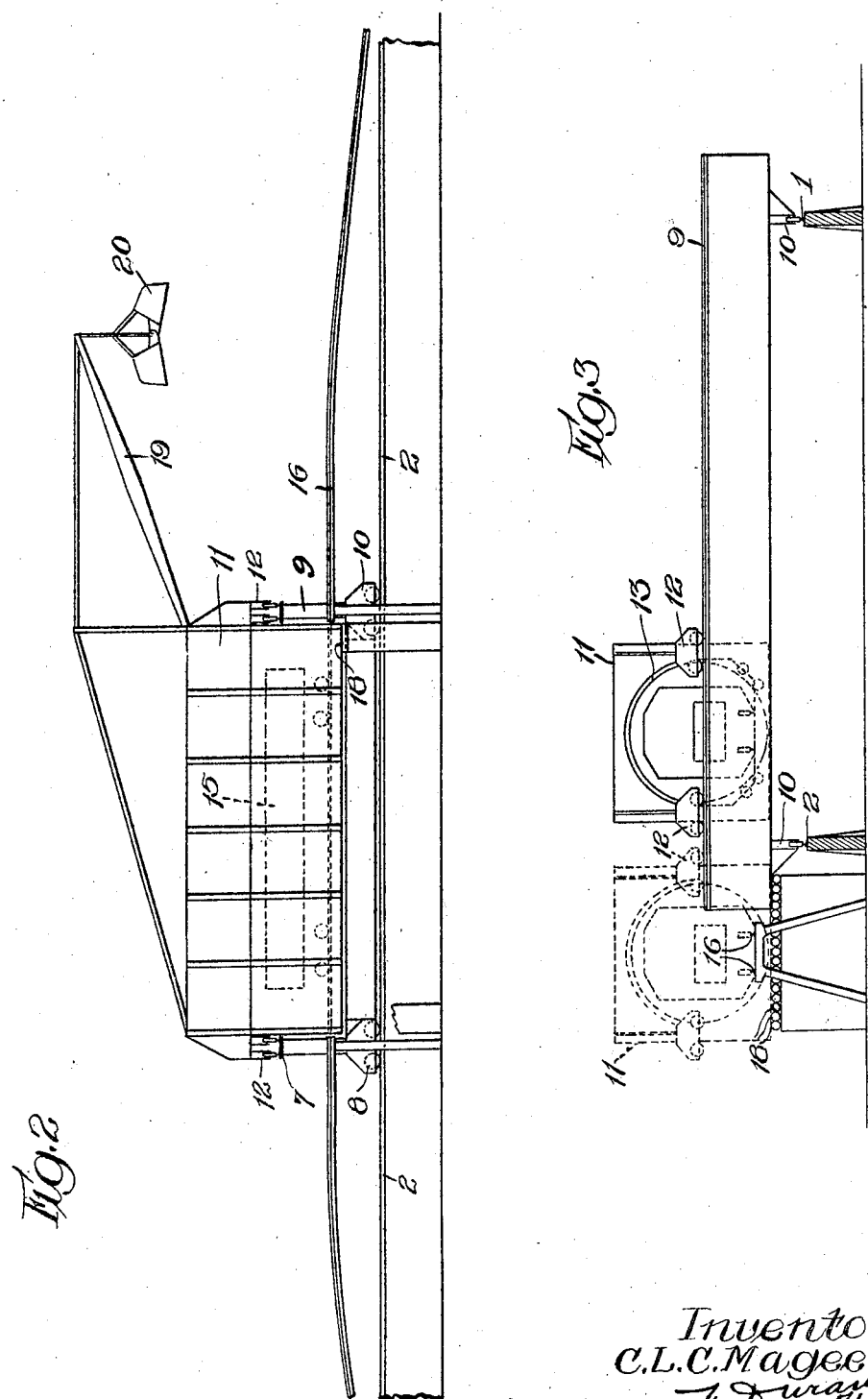

1,523,656

UNITED STATES PATENT OFFICE.

CHAUNCEY L. C. MAGEE, OF CHICAGO, ILLINOIS.

MACHINE FOR HANDLING MATERIALS.

Application filed June 1, 1920. Serial No. 385,436.

*To all whom it may concern:*

Be it known that I, CHAUNCEY L. C. MAGEE, a citizen of the United States of America, and a resident of Chicago, Illinois, have invented a certain new and useful Improvement in Machines for Handling Materials, of which the following is a specification.

This invention relates to apparatus for handling materials. More specifically considered, the invention relates to apparatus for handling sugar beets.

Generally stated, the object of the invention is to provide an improved construction and arrangement whereby a car of sugar beets, or any other materials, can be moved over the position where the beets or other materials are to be dumped, and then turned upside down to discharge the load, thus obviating the necessity of using slower methods of unloading the car, and avoiding injury to the beets or other materials, in the handling thereof, as will hereinafter more fully appear.

It is also an object to provide certain details and features of construction and novel combinations tending to increase the general efficiency and the desirability of an apparatus of this particular character.

To the foregoing and other useful ends the invention consists in matters hereinafter set forth and claimed and shown in the accompanying drawings, in which—

Fig. 1 is a plan of an apparatus for handling materials such as sugar beets, involving the principles of the invention.

Fig. 2 is a side elevation of said apparatus.

Fig. 3 is a transverse section on line 3—3 in Fig. 1.

As thus illustrated, the invention comprises the rails 1 and 2 which are parallel and spaced apart a distance to provide bins 3, 4, 5, and 6 for sugar beets, coal, coke and lime rock, respectively, or for any other materials. A bridge 7 is provided with wheels 8 that rest on said rails 1 and 2, and a similar bridge 9 provided with wheels 10 that rest on said rails. The two bridges 7 and 9 move together and really form one transverse bridge. A second bridge 11 is provided with wheeled trucks 12 that travel on the rails or top edges of the bridges 7 and 9, so that this bridge 11 can be placed in any position over the said bins. A rotary or roll-over car dump 13 is carried by the bridge 11, and is provided with rails 14 to receive the car 15 which carries the load of beets or other materials. This rotary or roll-over car dump is of any suitable, known or approved form, and is provided with the usual or any suitable means (not shown) for holding the car in position when the cylindric or cage-like structure is turned upside down to dump the load from the car.

A side track 16 is provided, parallel with the rail 2, in a suitably elevated position, with a gap or space 17 therein opposite the bridge 11, and rollers 18 are provided to support the bridge 11 in such a position that the rails 14 will be in alinement with the track 16, whereby a car on said track can be pushed into the rotary or roll-over car dump, when the latter is moved into the position shown in dotted lines in Fig. 3. Then the bridge 11 can be moved back over the space between the rails 1 and 2, and the bridge structure formed by the bridges 7 and 9 can then be shifted to the desired position, so that the loaded car can be unloaded at whatever point it is desired to dump the load. It will be understood that said bridges, and also the rotary or roll-over car dump, can be operated by power in any suitable, known or approved manner.

A boom or crane arm 19 is pivoted on one end of the bridge 11, to swing up and down and sidewise, in any suitable, known or approved manner, and is preferably provided with hoisting means in the form of a clam-shell bucket 20 of any suitable character. Said bucket can be supported for up and down motion as usual, and may be operated by winding drum mechanism (not shown) on the bridge 11, such as those ordinarily employd for purposes of this kind, or by any other suitable means.

As this clam-shell bucket form of excavating or carrying apparatus is well known, further description thereof is not necessary.

This clam-shell bucket can be used for any suitable or desired purpose, such as handling the beets or coal or rock or other materials. Also, of course, the crane arm thus mounted on the double bridge, one bridge being superimposed on the other, can be used in the erection of the building in which the apparatus is housed and in the construction of the tracks and other portions of the apparatus itself.

The two long girders or beams forming the bridges 7 and 9 can be connected together of course, by structural iron work of any suitable character so as to form one rigid bridge-like structure, as previously stated, by structural connecting elements of any suitable character. Of course, though, there must be ample space between these two girders or beams to permit dumping of the load in the desired manner, from the skeleton-like cage forming the roll-over car dump. For the same reasons, therefore, the bridge 11 must have sufficient open space at the bottom thereof, between the rails of the larger bridge, and between the sides of this second or superimposed bridge, to afford ample opportunity for freely discharging the load from the car downwardly into any of the bins shown and described. Thus one bridge is supported by and arranged transversely of the other, so that the car is supported parallel with the rails of the first track, between the sides of which latter are disposed the bins and storage space for the beets and other materials.

The operator's control platform (not shown) of any suitable, known or approved character, can be located, of course, on the uppermost bridge, or second bridge as it is called, thereby to enable the operator to control the movements of both bridges, as well as the operation of the rotary or roll-over car dump, and the operation of the clam-shell bucket. The load from the car can be dumped anywhere, as explained, after the car is once clamped in position in the rotary cage, without the necessity of subsequently loosening the car to shift it endwise, as might be necessary with only one bridge. With apparatus of the character shown and described, work can be done approximately which heretofore required the services of about fifty men, one or two men being sufficient to control the entire apparatus. The saving of labor, however, will depend more or less upon conditions, and will probably vary somewhat under different circumstances. Furthermore, with the construction and arrangement shown and described, an object of the invention is, of course, that a less number of cars is necessary in order to handle the materials in the required manner.

The bucket 20 constitutes a receptacle which is adapted to scoop or scrape up a load from a heap of materials and which is so carried or supported by the different bridges that it is movable in a straight line in a horizontal plane and is also movable at right angles to said line, in said plane, and has movement up and down as well, whereby the bridges have means for receiving a loaded car as well as means for scooping or scraping up a load from a heap of materials.

What I claim as my invention is:—

1. In apparatus of the character described, the combination of means forming a track, a bridge supported transversely to travel on said track, means forming a second track on said bridge, and a second traveling bridge on the second track, whereby one bridge is superimposed on the other bridge, so that the second bridge is movable either laterally or longitudinally and can be placed in any desired position over the storage space provided and formed between the rails of said first mentioned track, and means outside of said space to form a loading place for the second bridge, so that to receive the load the second bridge must pass over one side of said first mentioned track.

2. A structure as specified in claim 1, in combination with a rotary or roll-over car dump carried by said second or superimposed bridge.

3. A structure as specified in claim 1, in combination with means forming a third track extending parallel with said first mentioned track, and means to support said second or superimposed bridge in alinement with the said third track, whereby a car on the third track can be pushed onto the second bridge, in combination with means on the second bridge to dump the load from the car.

4. In apparatus of the character described, the combination of means forming a track, a traveling bridge on said track, said bridge spanning the space between the sides of the track, and a rotary or roll-over car dump on said bridge, the axis of said car dump extending transversely of said track, together with means at one end of said track to load said roll-over dump in the plane of said bridge.

5. A structure as specified in claim 4, in combination with means for supporting a car in position to be pushed into said rotary or roll-over car dump, when said bridge is shifted to one end of said track.

6. In apparatus of the class described, the combination of a traveling bridge, a roll-over dump on said bridge, a track for said bridge, and means independent of said track to support said bridge in position for said roll-over dump to receive a load therein.

7. A structure as specified in claim 6, in combination with means whereby said track forms a second traveling bridge.

8. A structure as specified in claim 6, the loading position of said roll-over dump being in the plane of said bridge.

CHAUNCEY L. C. MAGEE.